W. H. POWELL & R. B. WILLIAMSON.
DYNAMO ELECTRIC MACHINE.
APPLICATION FILED NOV. 21, 1910.

1,051,259.

Patented Jan. 21, 1913.

Witnesses:
John L. Johnson
Chas. L. Byron

Inventors
William H. Powell
Robert B. Williamson
By
Attorney

UNITED STATES PATENT OFFICE.

WILLIAM H. POWELL AND ROBERT B. WILLIAMSON, OF MILWAUKEE, WISCONSIN, ASSIGNORS TO ALLIS-CHALMERS COMPANY, A CORPORATION OF NEW JERSEY.

DYNAMO-ELECTRIC MACHINE.

1,051,259.  Specification of Letters Patent.  Patented Jan. 21, 1913.

Application filed November 21, 1910. Serial No. 593,350.

*To all whom it may concern:*

Be it known that we, WILLIAM H. POWELL and ROBERT B. WILLIAMSON, citizens of the United States, and residents of Milwaukee, in the county of Milwaukee and State of Wisconsin, have invented certain new and useful Improvements in Dynamo-Electric Machines, of which the following is a full, clear, and exact specification.

Our invention relates to dynamo-electric machines, and particularly to the ventilation of the rotating members thereof.

In the operation of dynamo-electric machines considerable heat is developed. In order to carry away this heat, various schemes of ventilation have been proposed, and have operated with more or less success.

It is the object of our present invention to improve upon the existing ventilating schemes, having particular reference to the ventilation of rotors.

In carrying out our invention the rotor is provided with longitudinal slots open at the periphery of the rotor at the central portion thereof but closed at the periphery near the end portions thereof. These slots are also open at their ends, preferably at some distance radially inward from the periphery, so that air may be drawn inward through the openings in the ends, may flow lengthwise of the slots toward the center, and pass out of the slots through the openings at the central part of the periphery. In case the rotor is the field member, these slots are preferably located in the field poles.

The various novel features of our invention will be apparent from the description and drawings, and will be particularly pointed out in the claims.

Figure 1:
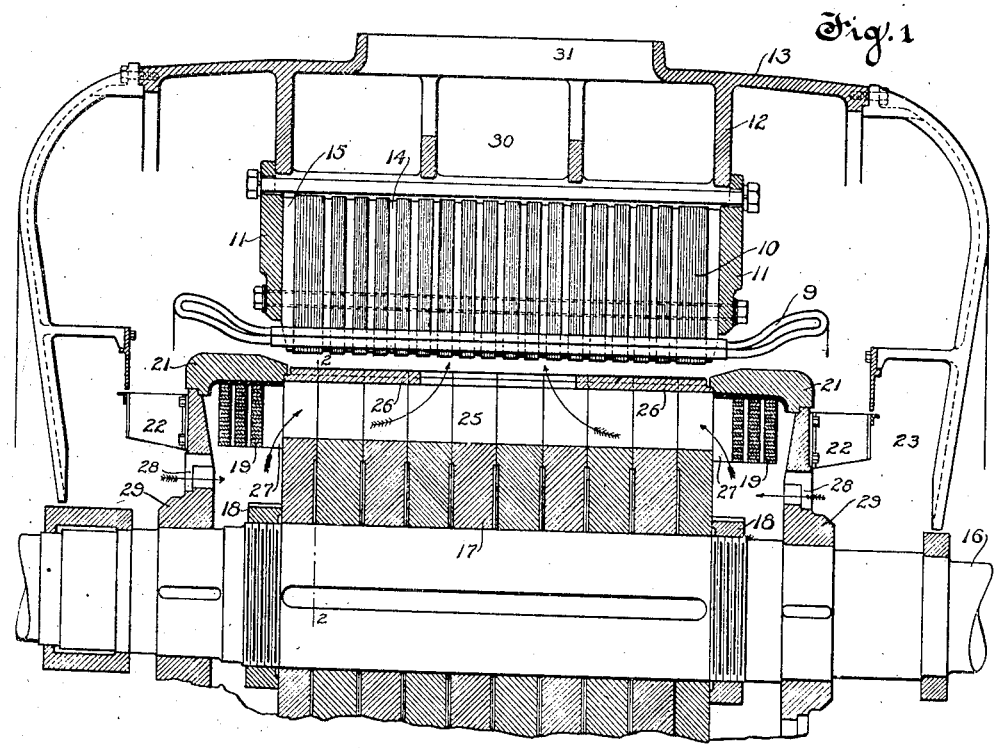
Figure 2:
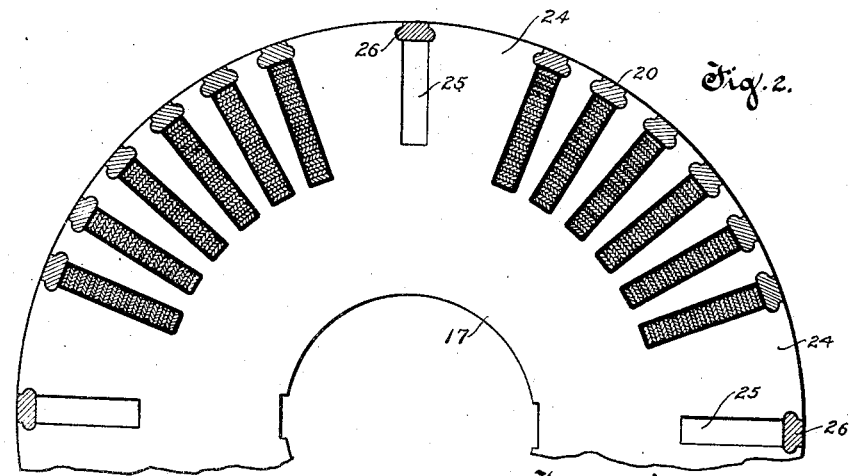

Figure 1 is a partial longitudinal section through a dynamo-electric machine embodying our invention; and Fig. 2 is a partial section through the rotor on the line 2—2 of Fig. 1.

The stator windings 9 are embedded in slots in the laminated stator core 10, which is clamped between end plates 11 and supported on ribs 12 of a stator frame 13. The stator core is provided with spaces 14 between groups of laminations and spaces 15 between the core and the end plates. A circulation of air may be maintained through these spaces in any desirable manner.

On the shaft 16 is mounted the core 17. This core may be built in any desired fashion, in the case illustrated comprising a number of disks assembled on the shaft and clamped between nuts 18. The rotor windings 19 are located in slots in the core 17 and held in place by wedges 20, as clearly shown in Fig. 2. The portions of the windings 19 which project beyond the ends of the core 17 are supported in any suitable manner, as by end bells 21 mounted on end disks 29. Fans 22, preferably mounted on such end disks, furnish the air for the ventilation of the stator, drawing it in, in the now well known fashion, through an admission chamber 23 open at the bottom.

The field coils 19 are so arranged in the core 17 that they form one or more pairs of field poles 24, the machine shown being a four pole machine. These field poles 24 are provided with longitudinal slots 25 extending radially inward some distance from the periphery or pole face. Wedges 26, similar to the wedges 20, close the peripheral or facial openings of the slots 25 for some distance from the ends of the core, leaving the slots open at the periphery at the middle portion of the core. The end turns of the coils 19 loop the ends of the slots 25, forming passageways from spaces 27 under such end turns. These spaces 27 are connected, through openings 28 in the end disks 29, to the admission chambers 23. Continuous passageways are thereby formed from admission chambers 25 through the slots 25.

In the operation of the machine, the rotor by its rotation draws in air from the chambers 23, through the openings 28 and the spaces 27, into the slots 25, the air then flowing lengthwise through the slots to the middle portion of the rotor and passing out at such middle portion through the peripheral openings of the slots into the air gap between the rotor and the stator. The air spreads out through this air gap, and escapes into the spaces associated with the stator core 10, passing thence into the chamber 30, which is open to the atmosphere at any suitable place, as at 31. The air in its passage through the rotor cools the latter in a marked degree.

Many modifications may be made in the precise arrangement shown and described, and all such which do not involve a departure from the spirit and scope of our invention we aim to cover in the following claims.

What we claim as new is:

1. A rotor of a dynamo-electric machine, comprising a core having pole faces with longitudinal slots open at the periphery of the rotor only near the middle thereof and open at the ends of the rotor core at their radially innermost portions.

2. A rotating field member of a dynamo-electric machine, comprising a longitudinally slotted core having pole faces, field windings located in some of said slots, others of said slots being in the pole faces and open at the periphery of the core only near the middle of the rotor and at the ends of the core at their radially innermost portions.

3. A rotating field member of a dynamo-electric machine, comprising a longitudinally slotted core, the slots extending inward from the periphery of the core, field windings located in some of said slots and partially closing the ends of others of the slots, and wedges for closing the peripheral openings of said other slots near the ends of the rotor core.

4. A rotating field member for dynamo-electric machines, comprising field poles, field windings associated with said field poles, said field poles being longitudinally slotted at the pole face, and wedges for closing the ends of the facial openings of said slots while leaving the middle parts of said facial openings open, the slots in the pole faces being open at their ends to a source of air supply.

5. A rotating member of a dynamo-electric machine, comprising a substantially cylindrical core having pole faces, said core having longitudinal slots in its periphery, field windings located in certain of said slots, others of said slots being in the faces of the field poles within such windings, solid wedges for partially closing the peripheral openings of the slots in the field poles, said slots in the field poles being open at their ends to a source of air supply.

6. A rotating field member of a dynamo-electric machine, having field poles provided with longitudinal slots in the pole faces, and imperforate means for partially closing the facial openings of said slots.

Milwaukee, Wis., Nov. 15, 1910.

In testimony whereof we affix our signatures in the presence of two witnesses.

WILLIAM H. POWELL.
ROBERT B. WILLIAMSON.

Witnesses:
G. B. SCHLEY,
CHAS. L. BYRON.